No. 734,059. PATENTED JULY 21, 1903.
A. I. GRAINGER.
BRACKET FOR SUPPORTING RODS OR TUBES.
APPLICATION FILED NOV. 25, 1901.
NO MODEL.

No. 734,059. Patented July 21, 1903.

UNITED STATES PATENT OFFICE.

ARTHUR INNES GRAINGER, OF ABERDEEN, SCOTLAND.

BRACKET FOR SUPPORTING RODS OR TUBES.

SPECIFICATION forming part of Letters Patent No. 734,059, dated July 21, 1903.

Application filed November 25, 1901. Serial No. 83,612. (No model.)

*To all whom it may concern:*

Be it known that I, ARTHUR INNES GRAINGER, a subject of the King of Great Britain, residing at 15 Stanley street, Aberdeen, in the county of Aberdeen, Scotland, have invented a new and useful Adjustable Angle-Jointed Bracket for Supporting Rods or Tubes, of which the following is a specification.

The tubes may be metal, wood, or other material and are designed to follow a line otherwise than straight, the said bracket being adjustable to varying angles.

The object of my invention is to render it unnecessary to bend rods or tubes for such purposes as bay-window curtain-poles or stair hand-rails, which object is accomplished in a stable and rigid manner, one feature of the invention being its simplicity of construction and adjustability to the slightest variation of any angle. I attain this object by the mechanism illustrated in the accompanying drawings, in which—

Figure 1:
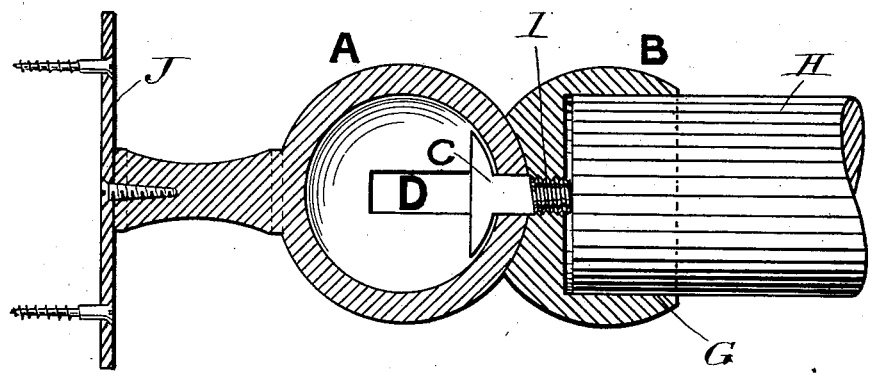
Figure 2:
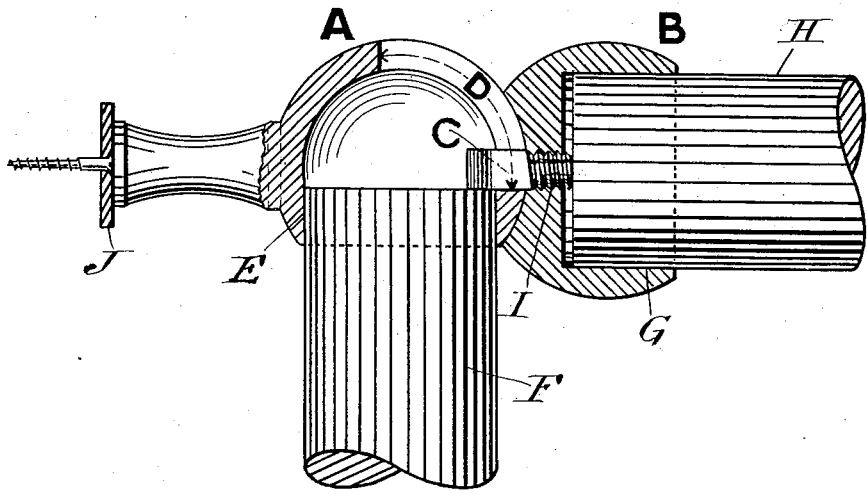

Figure 1 is a vertical section of the bracket and socket, the pole being shown in elevation; and Fig. 2 is a horizontal section of the bracket and socket, the two poles being shown in elevation.

In the drawings, A designates a bracket having a flange or plate J secured thereto at the inner end, said plate being provided with countersunk holes through which screws are inserted, by which the bracket is attached to the window-casing or other support. The bracket has a large hollow spherical-shaped head at the outer extremity. This sphere or ball at one side is provided with a slot D, and at the other side thereof is a large opening or socket E, adapted to receive one end of a curtain or other pole F. Part B is a movable socket, provided at one end with a concave depression adapted to fit the surface of the ball of the bracket A and at the other end with an opening G, constructed to receive a curtain or other pole H. At the base of the opening G and concentric therewith is a threaded aperture I. The socket B and the bracket are held together by means of a T-shaped bolt C. The head of this bolt is formed by two wings, which extend from opposite sides of the body and are preferably made convex on their under surfaces, so as to fit the inner surface of the ball. The neck portion of the bolt immediately beneath the head and which passes through the slot is made square, whereby the bolt is prevented from turning in the slot, but is free to be moved lengthwise thereof. The bolt may be inserted through the slot D from the inside of the ball, it being introduced into the ball through the opening E thereof, or the head and neck portion of the bolt may be passed completely through the slot from the outside of the ball, the breadth of these parts being for this purpose slightly less than that of the slot. The bolt may be given a quarter-turn, which brings it into its proper position. The socket B may be secured against the surface of the ball by turning the same as a nut upon the threaded portion of the bolt, which is entered in the threaded aperture of the socket. It will thus be seen that when the bracket A has been fixed in position the socket may be adjusted angularly about the ball of the bracket a distance limited by the end walls of the slot, whereby the angle which the two poles H and F make with one another may be varied within these limits. Should it be found desirable to hold the socket B rigid in any position on the ball, this result may accomplished by turning the socket on the bolt, so as to cause the former to tightly grip the ball. The rods or poles are simply inserted into the socket, no other holding means necessary. Should the rod H be tubular, the protruding end of the bolt may extend into the opening thereof; but where a solid pole is used a shorter bolt must be employed.

Having thus described my invention, what I claim is—

The combination with a pole-bracket having a hollow spherical-shaped head provided with a slot through one portion of the wall thereof, and a pole-socket formed in another portion of said wall, of the adjustable socket-piece having a threaded aperture, and a bolt having a T-head which engages the interior surface of the sphere, a square neck portion adjacent the head adjustably fitting the slot, and a threaded extremity engaging said threaded aperture in the socket-piece, substantially as described.

In testimony whereof I have signed my name to this specification in the presence of the subscribing witnesses.

ARTHUR INNES GRAINGER.

Witnesses:
WM. MURRAY,
JOHN W. GIBBS,
ANDREW MURRAY.